(12) United States Patent
Guo et al.

(10) Patent No.: US 11,480,834 B2
(45) Date of Patent: Oct. 25, 2022

(54) DISPLAY PANEL AND DISPLAY DEVICE

(71) Applicants: WUHAN BOE OPTOELECTRONICS TECHNOLOGY CO., LTD., Hubei (CN); BOE TECHNOLOGY GROUP CO., LTD., Beijing (CN)

(72) Inventors: Yuanhui Guo, Beijing (CN); Yujie Gao, Beijing (CN); Xia Shi, Beijing (CN); Wei Zhang, Beijing (CN)

(73) Assignees: WUHAN BOE OPTOELECTRONICS TECHNOLOGY CO., LTD., Hubei (CN); BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 17/265,924

(22) PCT Filed: Jul. 1, 2020

(86) PCT No.: PCT/CN2020/099787
§ 371 (c)(1),
(2) Date: Feb. 4, 2021

(87) PCT Pub. No.: WO2021/036499
PCT Pub. Date: Mar. 4, 2021

(65) Prior Publication Data
US 2022/0113572 A1    Apr. 14, 2022

(30) Foreign Application Priority Data
Aug. 23, 2019    (CN) .......................... 201910783697.7

(51) Int. Cl.
*G02F 1/1347*    (2006.01)
*G02F 1/1362*    (2006.01)

(52) U.S. Cl.
CPC ...... *G02F 1/1347* (2013.01); *G02F 1/136209* (2013.01); *G02F 1/136286* (2013.01); *G02F 2202/28* (2013.01); *G02F 2203/48* (2013.01)

(58) Field of Classification Search
None
See application file for complete search history.

(56) References Cited

U.S. PATENT DOCUMENTS

| | | |
|---|---|---|
| 2013/0249976 A1 | 9/2013 | Kunieda et al. |
| 2014/0098308 A1 | 4/2014 | Holzner et al. |
| | (Continued) | |

FOREIGN PATENT DOCUMENTS

| | | |
|---|---|---|
| CN | 103210341 A | 7/2013 |
| CN | 103268044 A | 8/2013 |
| | (Continued) | |

*Primary Examiner* — Shan Liu
(74) *Attorney, Agent, or Firm* — Dinsmore & Shohl LLP

(57) ABSTRACT

This disclosure relates to a display panel and a display device. The display panel includes: a display liquid crystal panel, including a plurality of sub-pixels defined by a first grid structure and arranged in an array; and a dimming liquid crystal panel, located on a light incident side of the display liquid crystal panel and stacked with the display liquid crystal panel, the dimming liquid crystal panel including a plurality of dimming pixels defined by a second grid structure and arranged in an array, and the second grid structure comprising a plurality of first shading lines extending in a waveform along a row direction; wherein the dimming liquid crystal panel further includes a plurality of second shading lines extending along the row direction, and the second shading lines are intersected with the first shading lines.

10 Claims, 4 Drawing Sheets

(56) References Cited

U.S. PATENT DOCUMENTS

| | | | |
|---|---|---|---|
| 2016/0054573 A1 | 2/2016 | Kasano et al. | |
| 2016/0321975 A1* | 11/2016 | Yan | G09G 3/2003 |
| 2017/0371467 A1 | 12/2017 | Kurasawa et al. | |
| 2018/0067578 A1 | 3/2018 | Konoshita et al. | |
| 2018/0120659 A1* | 5/2018 | Kim | G02F 1/136286 |
| 2018/0299726 A1* | 10/2018 | Oka | G02F 1/133528 |
| 2019/0265560 A1* | 8/2019 | Fukami | G02F 1/136286 |
| 2020/0103687 A1* | 4/2020 | Chang | G02F 1/134309 |
| 2020/0292894 A1 | 9/2020 | Liu et al. | |

FOREIGN PATENT DOCUMENTS

| | | | | |
|---|---|---|---|---|
| CN | 104793817 A | | 7/2015 | |
| CN | 107797691 A | | 3/2018 | |
| CN | 108983463 A | | 12/2018 | |
| CN | 109581728 A | * | 4/2019 | ....... G02F 1/133512 |
| CN | 109581728 A | | 4/2019 | |
| CN | 210199454 U | | 3/2020 | |
| WO | 2014196125 A1 | | 12/2014 | |

\* cited by examiner

DISPLAY PANEL AND DISPLAY DEVICE

CROSS-REFERENCE

The present disclosure is a U.S. National Stage Application under 35 U.S.C. § 371 of International Patent Application No. PCT/CN2020/099787, filed on Jul. 1, 2020, which claims the priority to the Chinese Patent Application No. 201910783697.7 filed on Aug. 23, 2019, the disclosure of both of which are incorporated herein by reference in its entirety.

TECHNICAL FIELD

The present disclosure relates to a display panel and a display device.

BACKGROUND

Among flat panel display devices, liquid crystal display devices have a dominant position in the product market due to their characteristics of small volume, low power consumption, relatively low manufacturing cost, no radiation, and the like. How to improve display quality of the liquid crystal display device and bring better viewing experience to users has always been a key research direction for those skilled in the art.

SUMMARY

According to an aspect of the embodiments of the present disclosure, there is provided a display panel comprising:
- a display liquid crystal panel, comprising a plurality of sub-pixels defined by a first grid structure and arranged in an array; and
- a dimming liquid crystal panel, located on a light incident side of the display liquid crystal panel and stacked with the display liquid crystal panel, the dimming liquid crystal panel comprising a plurality of dimming pixels defined by a second grid structure and arranged in an array, and the second grid structure comprising a plurality of first shading lines extending in a waveform along a row direction;
- wherein the dimming liquid crystal panel further comprises a plurality of second shading lines extending along the row direction, and the second shading lines are intersected with the first shading lines.

In some embodiments, the second shading lines extend in a straight line form or in the waveform.

In some embodiments, in the case that the second shading lines extend in the waveform, the first shading lines and the second shading lines extend in a curved waveform or a folded line waveform, respectively.

In some embodiments, the first shading lines and the second shading lines are on a same patterning layer.

In some embodiments, the waveform of the second shading lines is in opposite phase to that of the first shading line.

In some embodiments, the first shading lines and the second shading lines extend in the folded line waveform, respectively; the first shading lines comprise a plurality of first fold line units arranged periodically, each of which comprises two first straight line segments arranged symmetrically with a column direction as a symmetry axis; and the second shading lines comprise a plurality of second fold line units arranged periodically, each of which comprises two second straight line segments arranged symmetrically with the column direction as a symmetry axis.

In some embodiments, ends of a first straight line segment and ends of a second straight line segment are overlapped with the first grid structure in a direction perpendicular to the display liquid crystal panel; or intersections of the ends of the first straight line segment and the ends of the second straight line segment with the first grid structure are overlapped in the direction perpendicular to the display liquid crystal panel.

In some embodiments, a line width of the second shading line is smaller than that of the first shading line.

In some embodiments, each row of the sub-pixels comprises a plurality of pixel units, each of which comprises a plurality of sub-pixels different in color; and an area of the dimming pixel is not less than that of each of the plurality of pixel units.

In some embodiments, the area of the dimming pixel is substantially four times that of each of the plurality of pixel units.

In some embodiments, the first grid structure comprises: a plurality of first gate lines extending along the row direction, a plurality of first data lines extending along a column direction and a shading matrix on a side, away from the dimming liquid crystal panel, of the first gate lines and the first data lines, wherein line widths of both the first gate lines and the first data lines are smaller than that of the shading matrix, and the first gate lines and the first data lines are overlapped with the shading matrix in the direction perpendicular to the display liquid crystal panel.

In some embodiments, the second grid structure further comprises: a plurality of second gate lines extending along the row direction and a plurality of second data lines extending along a column direction, the second gate lines and the second data lines being on a side, away from the display liquid crystal panel, of the first shading lines, wherein a line width of the second gate lines is smaller than that of the first shading lines, and the second gate lines are overlapped with the first shading lines in a direction perpendicular to the display liquid crystal panel.

In some embodiments, the second data lines extend in a straight line form or a folded line waveform.

In some embodiments, the dimming liquid crystal panel and the display liquid crystal panel are adhered through a transparent optical adhesive; or the dimming liquid crystal panel and the display liquid crystal panel share a same manufacturing substrate on a side close to each other.

According to another aspect of the embodiments of the present disclosure, there is provided a display device comprising the display panel of any of the foregoing embodiments.

Other features of the present disclosure and advantages thereof will become apparent from the following detailed description of the embodiments of the present disclosure with reference to the accompanying drawings.

BRIEF DESCRIPTION OF THE DRAWINGS

The accompanying drawings, which constitute a part of this specification, illustrate the embodiments of the disclosure, and together with the specification, serve to explain the principles of the present disclosure.

The present disclosure may be more clearly understood from the following detailed description with reference to the accompanying drawings, in which.

It should be understood that dimensions of various parts shown in the drawings are not drawn to actual scale. Further, identical or similar reference numerals denote identical or similar members.

DETAILED DESCRIPTION

Figure 1:
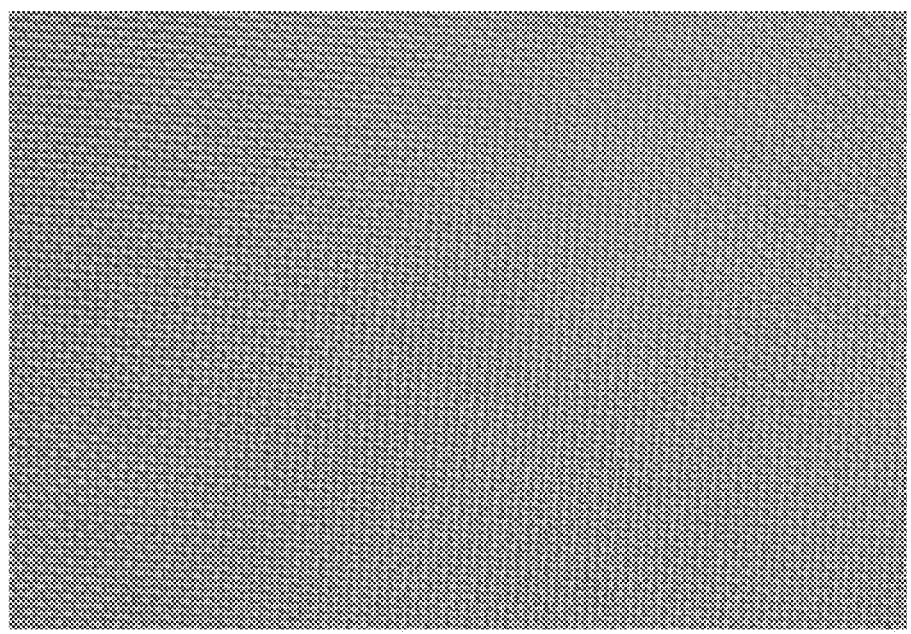
FIG. 1 is a schematic diagram of a partial picture of a display panel in the related art.

Various exemplary embodiments of the present disclosure will be described in detail with reference to the accompanying drawings in the following. The following description of the exemplary embodiments is merely illustrative in nature and is in no way intended to limit this disclosure, its application, or uses. The present disclosure may be implemented in many different forms and is not limited to the embodiments described herein. These embodiments are provided merely for making the present disclosure thorough and complete, and sufficiently expressing the scope of the present disclosure to one of ordinary skill in the art. It should be noted that the relative arrangement of the components and steps set forth in these embodiments are interpreted to be merely illustrative instead of restrictive, unless it is specifically stated otherwise.

The words "first", "second" and the like used in the present disclosure do not imply any sequence, number or importance, but are merely used to distinguishing different portions. The word "comprise" or "include" or the like means that an element preceding the word covers elements listed following the word, but does not preclude the possibility of covering also other elements. The terms "up", "down", "left", "right" and the like are merely used for implying relative position relations, and after an absolute position of the object described changes, the relative position relation may possibly change correspondingly.

In this disclosure, when a specific device is described between a first device and a second device, an intermediate device may exist between the specific device and the first device or the second device, or an intermediate device may not exist.

All terms (including technical or scientific terms) used in this disclosure have the same meanings as understood by one of ordinary skill in the art, unless otherwise specifically defined. It should also be understood that the terms defined in common dictionaries should be interpreted as having meanings consistent with their meanings in the context of the relevant technologies, but should not be interpreted with idealized or extremely formalized meanings, unless otherwise expressly defined herein.

Techniques, methods and apparatus as known by one of ordinary skill in the relevant art may not be discussed in detail, but are intended to be regarded as a part of the specification where appropriate.

The display panel according to the embodiments of the present disclosure further improves grids and dark spots on the premise that moire patterns of a display picture are improved, thereby having better display quality.

Currently, liquid crystal display devices are common display devices in the market. A conventional liquid crystal display device generally comprises a liquid crystal display panel and a backlight module on a light incident side of the liquid crystal display panel. The liquid crystal display panel comprises: an array substrate and a filtering substrate disposed oppositely to form a liquid crystal cell, a liquid crystal disposed between the array substrate and the filtering substrate, a first polarizer disposed on a side of the array substrate away from the filtering substrate, and a second polarizer disposed on a side of the filtering substrate away from the array substrate, wherein the array substrate is closer to the backlight module relative to the filtering substrate, and polarization directions of the first polarizer and the second polarizer are orthogonal. The liquid crystal display panel comprises a plurality of pixel units, each of which comprises a plurality of sub-pixels different in color. Light mixing of sub-pixels in a same pixel unit according to a certain proportion can make the pixel unit display colors visible to human eyes. Such a conventional liquid crystal display device has technical defects of poor picture contrast and dark-state light leakage due to its own structural characteristics.

In order to improve the foregoing defects, a liquid crystal display device using a dual-panel driving technique is proposed in the related art. A main difference from the foregoing conventional liquid crystal display device is that, its display panel comprises a dimming liquid crystal panel and a display liquid crystal panel which are stacked. Herein, the display liquid crystal panel has a similar structure and operation principle to the foregoing liquid crystal display panel, and the dimming liquid crystal panel is disposed on a light incident side of the display liquid crystal panel and on a light exiting side of the backlight module, and comprises a plurality of dimming pixels arranged in an array. Each dimming pixel serves as a dimming unit for controlling a direction and intensity of a backlight incident into a respective area of the display liquid crystal panel via the dimming pixel.

The liquid crystal display device in the related art can realize finer area dimming of a picture, and the principle thereof is to adjust light transmission (i.e., direction and/or intensity of the backlight to be allowed to transmit through) of a respective dimming pixel of the dimming liquid crystal panel according to gray scales of the displayed picture in different areas. For example, for an area with higher picture luminance, the light transmittance of the respective dimming pixel of the dimming liquid crystal panel is also adjusted to be relatively higher; for an area with a lower picture luminance, the light transmittance of the respective dimming pixel of the dimming liquid crystal panel is also adjusted to be relatively lower; for an area with a black picture display, the light transmittance of the respective dimming pixel of the dimming liquid crystal panel is adjusted to be substantially zero. Compared with the foregoing conventional liquid crystal display device, such a liquid crystal display device can overcome the defect of dark-state light leakage of the picture, and significantly enhance the contrast, thereby bringing better viewing experience for a user. Particularly, when the liquid crystal display device performs HDR (High-Dynamic Range) display, the area dimming makes the luminance range of the picture wider, low gray scale transition more natural, and display effect better.

However, since pixel sizes of the dimming liquid crystal panel and the display liquid crystal panel are in a same order of magnitude, and spatial periods thereof are close to each other, light and dark alternate stripes, i.e., moire patterns, are easily generated on the picture after the dimming liquid crystal panel and the display liquid crystal panel are stacked. The moire pattern is an embodiment of the beat principle.

In order to improve the moire patterns, another related art proposes a solution that gate lines extending along a row direction of the dimming liquid crystal panel are designed in a folded line waveform, and shading is made, from a side close to the display liquid crystal panel, by shading lines with the same form but a larger line width. In such a related art, grid forms of the dimming liquid crystal panel and the display liquid crystal panel are obviously different, and the moire patterns are not easy to be perceived by human eyes after stacking, thereby improving or eliminating the moire patterns.

The inventors of the present application found in the research and development process of related products that, in the foregoing related art capable of improving the moire patterns, since there is a significant difference between resolutions of the dimming liquid crystal panel and the display liquid crystal panel, as shown in FIG. 1, grids and dark spots still can be seen on the display picture thereof, thereby degrading the viewing experience.

The embodiments of the present disclosure provide a display panel and a display device, so as to improve the grids and dark spots of the picture for the display device and enhance the display quality of the display device.

Figure 2:
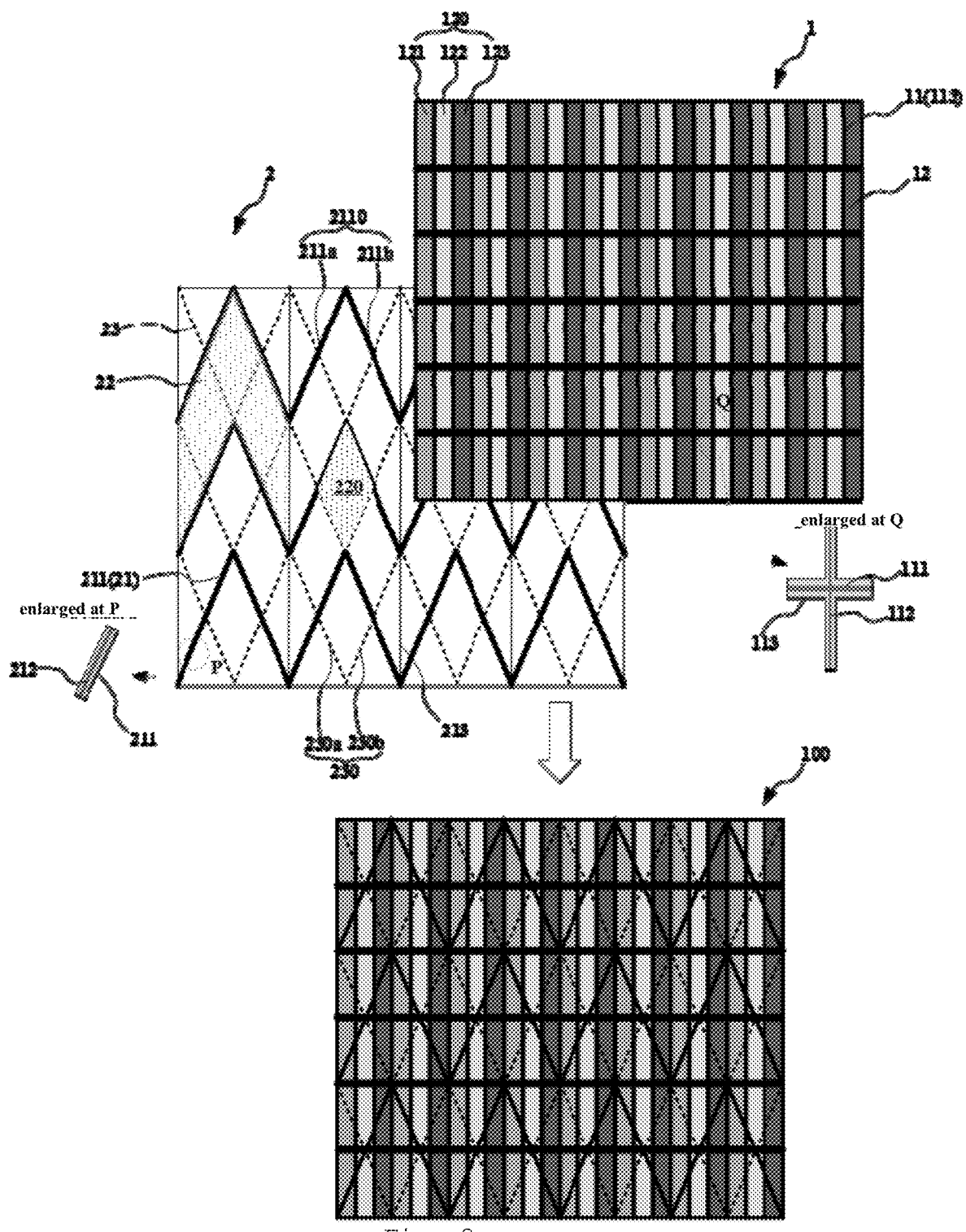
FIG. 2 is a schematic structural diagram of a display panel according to an embodiment of the present disclosure.

As shown in FIG. 2, a display panel provided by the embodiments of the present disclosure comprises a dimming liquid crystal panel 2 and a display liquid crystal panel 1 which are stacked, wherein:

the display liquid crystal panel 1 comprises a plurality of sub-pixels 12 defined by a first grid structure 11 and arranged in an array;

the dimming liquid crystal display panel 2 is disposed on a light incident side of the display liquid crystal panel 1, and comprises a plurality of dimming pixels 22 defined by a second grid structure 21 and arranged in an array, the second grid structure 21 comprising a plurality of first shading lines 211 which extend in a waveform along a row direction; and the dimming liquid crystal panel 2 further comprises a plurality of second shading lines 23 extending along the row direction, and the second shading lines 23 are intersected with the first shading lines 211.

In FIG. 2, in order to distinguish the first shading lines 211 from the second shading lines 23, the two are illustrated by different lines.

The structure and operation principle of the display liquid crystal panel 1 are similar to those of the foregoing conventional art and related art, and thus are not repeated here. In the embodiments of the present disclosure, as shown by an enlarged view at Q in FIG. 2, the first grid structure 11 comprises: a plurality of first gate lines 111 extending in the row direction, a plurality of first data lines 112 extending in a column direction, and a shading matrix 113 disposed on a side, away from the dimming liquid crystal panel 2, of the first gate lines 111 and the first data lines 112, wherein line widths of the first gate line 111 and the first data line 112 are both smaller than that of the shading matrix 113, and the first gate lines 111 and the first data lines 112 are overlapped with the shading matrix 113 in a direction perpendicular to the display liquid crystal panel 1.

It is to be understood that, in order to support gray scale display of the sub-pixels 12, a first thin film transistor (not shown in the figure) is further provided corresponding to each sub-pixel 12, and the first thin film transistor is provided at an intersection of the first gate line 111 and the first data line 112. Observed from a light exiting side of the display liquid crystal panel 1, the first thin film transistor, the first gate line 111, and the first data line 112 are not visible as being shaded by the shading matrix 113.

The dimming pixel 22 is used by the dimming liquid crystal panel 2 as a control unit for area dimming of the picture. As shown in FIG. 2, the dimming pixels 22 of the dimming liquid crystal panel 2 are defined by the second grid structure 21. As shown by an enlarged view at P in FIG. 2, in addition to the foregoing first shading lines 211, the second grid structure 21 further comprises a plurality of second gate lines 212 extending along the row direction and a plurality of second data lines 213 extending along the column direction. The second gate lines 212 and the second data lines 213 are on a side of the first shading lines 211 away from the display liquid crystal panel 1, the second gate lines 212 and the first shading lines 211 have substantially the same form, but a line width of the second gate line 212 is smaller than that of the first shading line 211, and the second gate lines 212 are overlapped with the first shading lines 211 in the direction perpendicular to the display liquid crystal panel 1. Observed from the light exiting side of the dimming liquid crystal panel 2, the second gate line 212 is invisible as being shaded by the first shading line 211. In addition, a line width of the second data line 213 is much smaller than that of the second gate line 212, which essentially will not cause light leakage between adjacent dimming pixels, thus the second data line 213 does not need to be shaded in the dimming liquid crystal panel 2. The second data line 213 may extend in a straight line form or in a folded line waveform.

In the related art, because of an obvious difference between resolutions of the dimming liquid crystal panel and the display liquid crystal panel, the grid structure of the dimming liquid crystal panel is more prominent on the display picture. In addition, due to the design of specially-shaped dimming pixels, the luminance of the dimming pixels close to sharp corners of fold lines is lower than that of other parts, and when the resolution of the dimming liquid crystal panel is not ideal, the uneven luminance is obvious, thus forming dark spots on the display picture.

In order to improve the defects of grids and dark spots on the picture in the related art, in the embodiments of the present disclosure, a plurality of second shading lines 23 extending along the row direction are further provided on the dimming liquid crystal panel 2, and the second shading lines 23 are intersected with the first shading lines 211. In this way, visually, the second grid structure 21 is divided into a plurality of sub-regions 220 by the plurality of second shading lines 23 and the plurality of first shading lines 211, thus visually reducing the difference between physical resolutions of the dimming liquid crystal panel 2 and the display liquid crystal panel 1, thereby lessening the visual influence of the second grid structure 21 on the display picture, improving the grids and dark spots of the picture, and enhancing the display quality.

It can be understood that the function of the second shading lines 23, which is different from those of the foregoing shading matrix 113 and first shading lines 211, is mainly to adjust a visual resolution of the dimming liquid crystal panel 2 as auxiliary shading lines. In order to minimize the influence of the second shading line 23 on an aperture ratio of the sub-pixel 12, in the embodiments of the present disclosure, a line width of the second shading line 23 can be smaller than that of the first shading line 211, thus reducing an overlapping area of the second shading line 23 with the sub-pixel 12. The specific line widths of the first shading lines 211 and the second shading lines 23 can be designed according to specific structures and dimensional specifications of products, and are not particularly limited herein.

The main layer structure of the dimming liquid crystal display panel 2 comprises an array substrate and an opposite substrate arranged opposite to each other to form a liquid crystal cell, and a liquid crystal between the array substrate and the opposite substrate, wherein the opposite substrate is closer to the display liquid crystal panel than the array substrate. The structure of the liquid crystal cell of the dimming liquid crystal panel 2 is similar to that of the display liquid crystal panel 1, but a filtering layer is not required on the dimming liquid crystal panel 2. The second gate line 212 and the second data line 213 are arranged on the array substrate, and in order to control the dimming pixels 22, a second thin film transistor is further provided corresponding to each dimming pixel 22, and is arranged at an intersection of the second gate line 212 and the second data line 213. The first shading lines 211 and the second shading lines 23 can be arranged on opposite substrates, and can be located in the same patterning layer and be formed in a same patterning process, so that manufacturing cost will not be increased. In other embodiments of the present disclosure, the first shading lines 211 and the second shading lines 23 can also be located in different patterning layers, i.e. arranged in different layers.

A specific form of the first shading line 211 of the dimming liquid crystal panel 2 is not limited, for example, the first shading line 211 can extend in a curved waveform or a folded line waveform shown in the figure, which can well eliminate the moire patterns. The second shading lines 23 can also extend in the curved waveform or the folded line waveform shown in the figure. In addition, the second shading line 23 can further adopt other forms such as straight line, which can also improve the dark spots and grids to a certain extent.

As shown in FIG. 2, in the embodiment of the present disclosure, the first shading line 211 and the second shading line 23 respectively extend in the folded line waveform. According to the principle that a straight line between two points is the shortest, in order to minimize overlapping areas of the first shading line 211 and the second shading line 23 with the sub-pixel 12 and thus increase the aperture ratio of the sub-pixel 12, the first shading line 211 comprises a plurality of first fold line units 2110 arranged periodically, and each first fold line unit 2110 comprises two first straight line segments 211a and 211b symmetrically arranged with the column direction as a symmetry axis. The second shading line 23 comprises a plurality of second fold line units 230 arranged periodically, and each second folding unit 230 comprises two second straight line segments 230a and 230b symmetrically arranged with the column direction as a symmetry axis.

Figure 3:
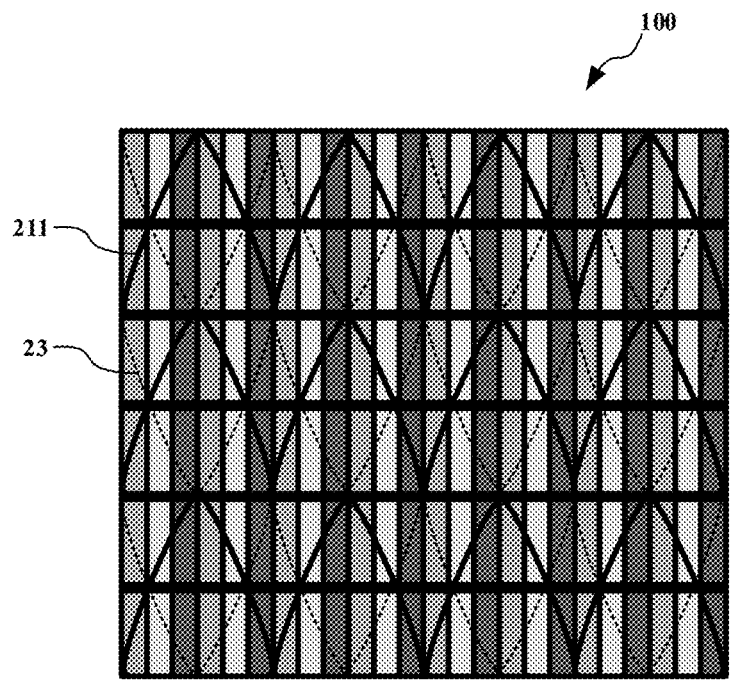
FIG. 3 is a schematic partial diagram of a display panel according to an embodiment of the present disclosure.

As shown in FIG. 3, in some other embodiments of the present disclosure, the two first straight line segments 211a and 211b of the first shading line 211 and the two second straight line segments 230a and 230b of the second shading line 23 in FIG. 2 can also be replaced with arc segments, which still can improve the moire patterns and the grids and dark spots of the picture.

In some embodiments of the present disclosure, as shown in FIGS. 2 and 3, the waveforms of the second shading line 23 and the first shading line 211 are in opposite phase, i.e., a phase difference thereof is π. In this way, visually, the plurality of second shading lines 23 can further subdivide the second grid structure 21 into a plurality of sub-regions 220 substantially uniformly, thereby further helping to improve the grids and dark spots of the picture. Of course, the first shading lines 211 and the second shading lines 23 may not be designed to be completely antiphase, and as long as the two are intersected with each other significantly, the grids and dark spots of the picture can be improved to some extent.

In some embodiments of the present disclosure, ends of the first straight line segments 211a, 211b and ends of the second straight line segments 230a, 230b are overlapped with the first grid structure 11 in the direction perpendicular to the display liquid crystal panel 1, respectively. In order to facilitate the design of the second data line 213 and better eliminate the moire patterns, intersections of the ends of the first straight line segments 211a, 211b and the ends of the second straight line segments 230a, 230b with the first grid structure 11 are overlapped in the direction perpendicular to the display liquid crystal panel 1, respectively.

As shown in FIG. 2, each row of the sub-pixels 12 of the display liquid crystal panel 1 comprises a plurality of pixel units 120, and each pixel unit 120 comprises a plurality of sub-pixels different in color, for example, a first sub-pixel 121, a second sub-pixel 122, and a third sub-pixel 123 which are arranged in sequence. The physical resolution of the dimming pixels 22 can be designed according to fineness requirements on area dimming. In the embodiments of the present disclosure, an area of the dimming pixel 22 is not less than that of the pixel unit 120. For example, in some embodiments, the area of the dimming pixel is substantially four times that of the pixel unit. In some other embodiments, the area of the dimming pixel is substantially 16 times that of the pixel unit. In still other embodiments, the area of the dimming pixel is substantially 1.5 times that of the pixel unit. An area ratio of the dimming pixel to the pixel unit can be designed to be other values, which are not listed herein. In view of specific structures and manufacturing tolerances of the first grid structure 11 and the second grid structure 21, the word "substantially" herein should be understood to be within a certain tolerance.

Figure 4:
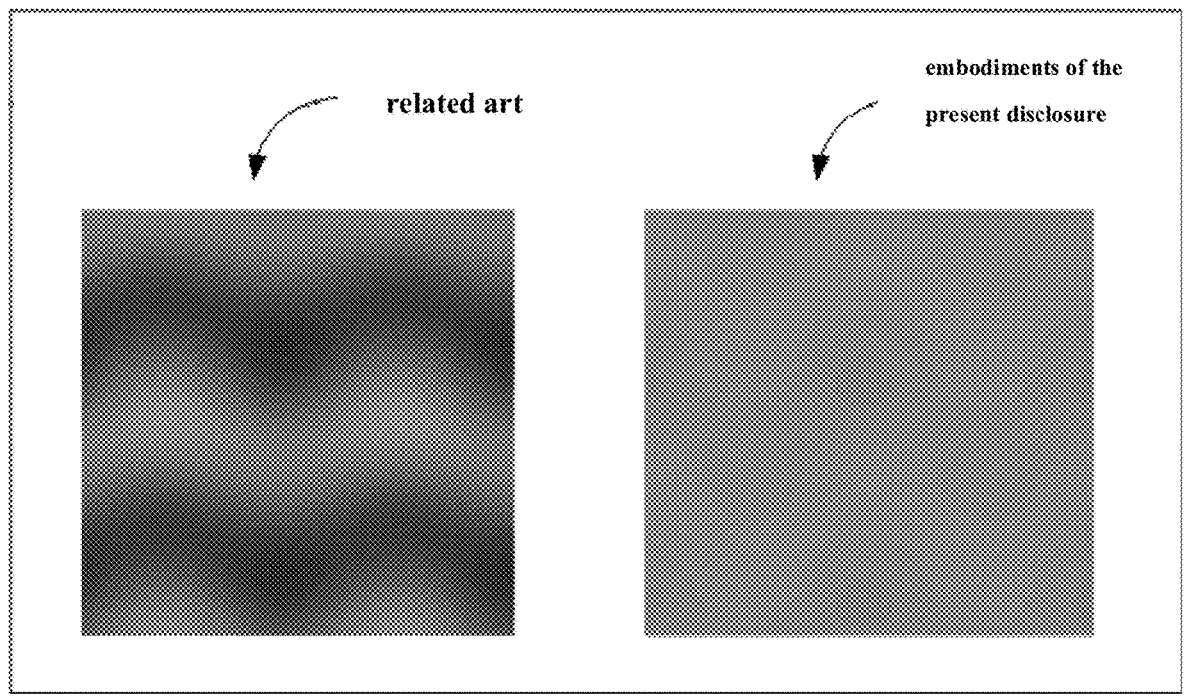
FIG. 4 is a simulation comparison diagram between partial pictures of a display panel according to an embodiment of the present disclosure and a display panel in the related art.

The inventors of the present disclosure performed picture simulation for the display panel in the related art and the display panel according to some embodiments of the present disclosure, respectively, and the comparison result is shown in FIG. 4. With respect to the display panel in the related art, the physical resolution of the display liquid crystal panel is 8K, the physical resolution of the dimming liquid crystal panel is 2K, the dimming liquid crystal panel is provided with the foregoing first shading lines but not with the foregoing second shading lines, and the picture simulation is shown in a left diagram of FIG. 4. With respect to the display panel according to the embodiments of the present disclosure, the physical resolution of the display liquid crystal panel is 8K, the physical resolution of the dimming liquid crystal panel is 2K, the dimming liquid crystal panel is provided with both the first shading lines and the second shading lines, and the picture simulation is shown in a right diagram of FIG. 4. It can be seen that, the dark dots and grids displayed in the picture of the related art are effectively improved in that of the embodiments of the present disclosure, and the picture display effect of the display panel according to the embodiments of the present disclosure is better.

In summary, with respect to the display panel according to the embodiments of the present disclosure, the physical resolution of its dimming liquid crystal panel may not be adjusted relative to the related art, but the dark spots and grids of the display panel can be effectively improved, thereby effectively enhancing the picture quality.

Figure 5A:
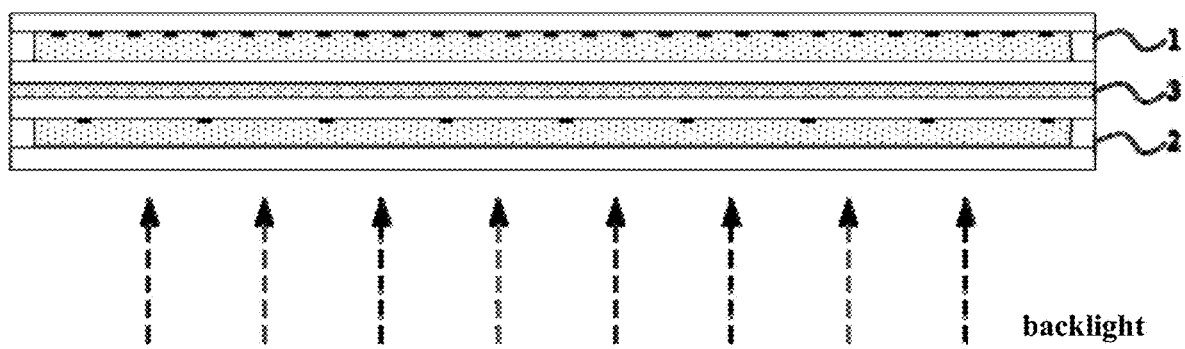
FIG. 5a is a schematic cross-sectional diagram of a display panel according to an embodiment of the present disclosure.
Figure 5B:
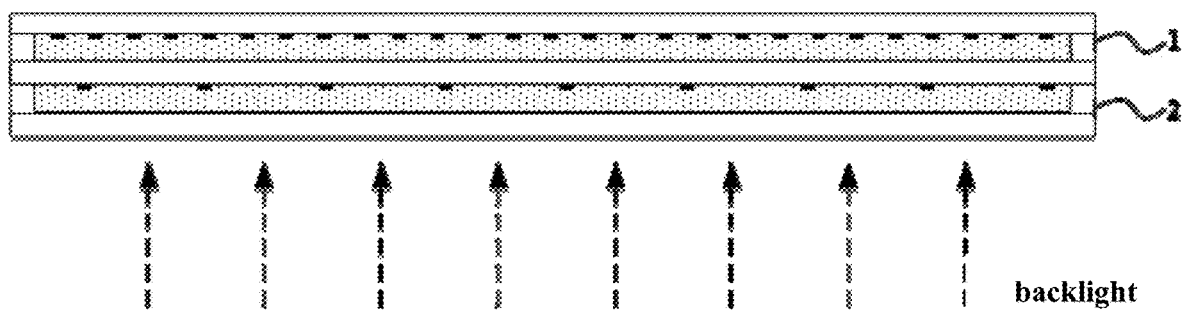
FIG. 5b is a schematic cross-sectional diagram of a display panel according to another embodiment of the present disclosure.

In an embodiment of the present disclosure, as shown in FIG. 5a, the dimming liquid crystal panel 2 and the display liquid crystal panel 1 are adhered through a transparent optical adhesive 3, where manufacturing process is simple and maintenance is easy. In some other embodiments, as shown in FIG. 5b, the dimming liquid crystal panel 2 and the display liquid crystal panel 1 can also share a same manufacturing substrate on a side close to each other, thereby helping to reduce thickness of the display panel and decrease manufacturing cost.

The embodiments of the present disclosure further provide a display device, which comprises the display panel of any of the foregoing embodiments. The display device can realize fine area dimming of the picture, has excellent contrast performance, and effectively improves the moire patterns, dark spots and grids of the picture, thus the picture quality is higher, thereby remarkably enhancing user experience. A specific product type of the display device is not limited, and may be, for example, a display, a tablet computer, a notebook computer, a television set, an ATM apparatus, an electronic paper, a display screen, and the like.

Although some specific embodiments of the present disclosure have been described in detail by way of example, it should be understood by those skilled in the art that the above examples are for illustration only and are not intended to limit the scope of the present disclosure. It will be appreciated by those skilled in the art that modifications can be made to the above embodiments without departing from the scope and spirit of the present disclosure. The scope of the present disclosure is defined by the appended claims.

What is claimed is:

1. A display panel comprising:
    a display liquid crystal panel, comprising a plurality of sub-pixels defined by a first grid structure and arranged in an array; and
    a dimming liquid crystal panel, located on a light incident side of the display liquid crystal panel and stacked with the display liquid crystal panel, the dimming liquid crystal panel comprising:
        a plurality of dimming pixels defined by a second grid structure and arranged in an array, wherein the second grid structure comprises a plurality of first shading lines extending in a folded line waveform along a row direction; and
        a plurality of second shading lines extending in a folded line waveform along the row direction, and intersected with the first shading lines,
    wherein:
    the waveform of the second shading lines is in opposite phase to the waveform of the first shading line;
    the first shading lines comprise a plurality of first fold line units arranged periodically, each of which comprises two first straight line segments arranged symmetrically with a column direction as a symmetry axis; and
    the second shading lines comprise a plurality of second fold line units arranged periodically, each of which comprises two second straight line segments arranged symmetrically with the column direction as the symmetry axis;
    ends of a first straight line segment and ends of a second straight line segment are overlapped with the first grid structure in a direction perpendicular to the display liquid crystal panel; or
    the ends of the first straight line segment and the ends of the second straight line segment and intersections of the first grid structure are overlapped in the direction perpendicular to the display liquid crystal panel.

2. The display panel according to claim 1, wherein the first shading lines and the second shading lines are on a same patterning layer.

3. The display panel according to claim 1, wherein a line width of the second shading lines is smaller than that of the first shading lines.

4. The display panel according to claim 3, wherein:
    each row of the sub-pixels comprises a plurality of pixel units, each of the plurality of pixel units comprising a plurality of sub-pixels different in color; and
    an area of the dimming pixel is not less than that of each of the plurality of pixel units.

5. The display panel according to claim 4, wherein the area of the dimming pixel is substantially four times that of each of the plurality of pixel units.

6. The display panel according to claim 1, wherein the first grid structure comprises:
    a plurality of first gate lines extending along the row direction;
    a plurality of first data lines extending along a column direction; and
    a shading matrix disposed on a side, away from the dimming liquid crystal panel, of the first gate lines and the first data lines,
    wherein line widths of both the first gate lines and the first data lines are smaller than that of the shading matrix, and the first gate lines and the first data lines are overlapped with the shading matrix in the direction perpendicular to the display liquid crystal panel.

7. The display panel according to claim 1, wherein the second grid structure further comprises:
    a plurality of second gate lines extending along the row direction; and
    a plurality of second data lines extending along a column direction, the second gate lines and the second data lines being disposed on a side, away from the display liquid crystal panel, of the first shading lines, wherein a line width of the second gate lines is smaller than that of the first shading lines, and the second gate lines are overlapped with the first shading lines in the direction perpendicular to the display liquid crystal panel.

8. The display panel according to claim 7, wherein the second data lines extend in a straight line form or a folded line waveform.

9. The display panel according to claim 1, wherein:
    the dimming liquid crystal panel and the display liquid crystal panel are adhered through a transparent optical adhesive; or
    the dimming liquid crystal panel and the display liquid crystal panel share a same manufacturing substrate on a side close to each other.

10. A display device comprising the display panel according to claim 1.

* * * * *